July 19, 1960
D. B. PALL
2,945,591
FILTER
Filed Sept. 20, 1956
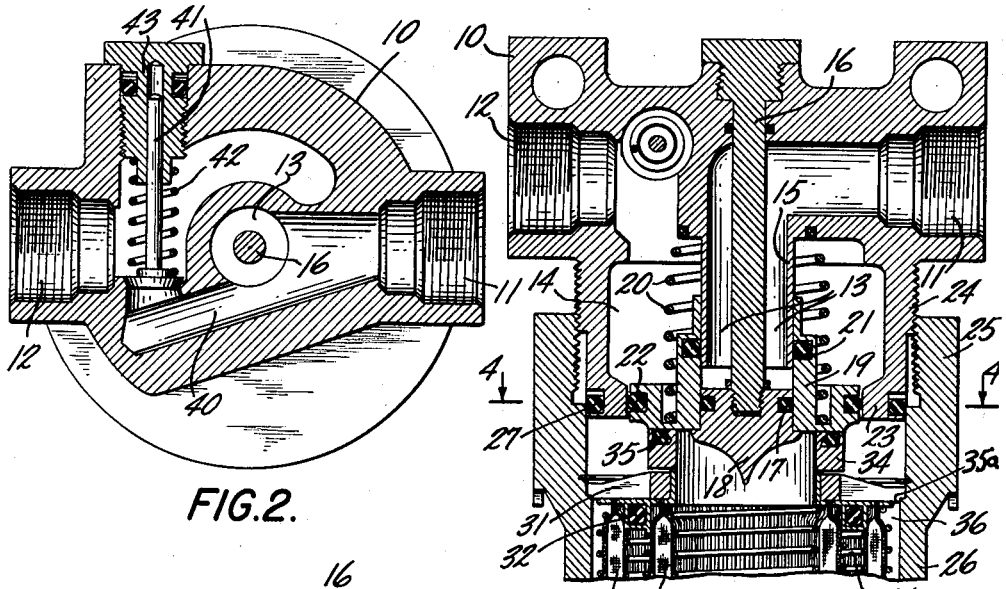
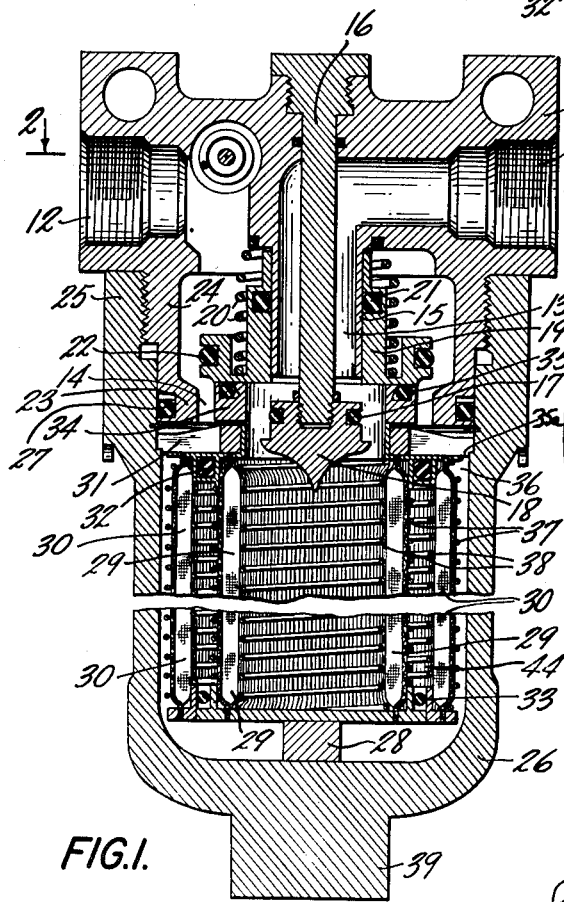
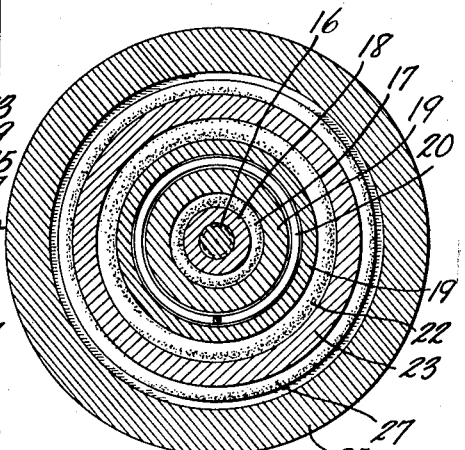
INVENTOR.
DAVID B. PALL
BY Campbell, Brumbaugh, Free & Graves
his ATTORNEYS United States Patent Office 2,945,591
Patented July 19, 1960

2,945,591
FILTER

David B. Pall, Roslyn Heights, N.Y., assignor, by mesne assignments, to Pall Corporation, a corporation of New York Filed Sept. 20, 1956, Ser. No. 610,917
4 Claims. (Cl. 210—234)

This invention relates to a filter mechanism for use in removing suspended foreign matter from fluids, and particularly to a filter mechanism for use in filtering hydraulic fluid in high pressure hydraulic fluid systems.

Many types of filters and filter assemblies are presently available for use in the filtering of fluids such as lubricating oil, hydraulic fluids and the like. These filters employ various types of filter elements and may be used to remove suspended particles having a size as little as 5 microns in largest dimension. These filters are very useful where the system employing a given fluid is sensitive to the presence of particles and a particle-free fluid must be maintained for efficient use and long life of the system.

One use for filters of the type with which this invention is concerned is in hydraulic systems for aircraft. Several filters of varying types are now employed in this capacity and all serve fairly well in removing the suspended particles for which the filter is designed. One important disadvantage, however, is present in all of the presently available devices. In hydraulic systems, particularly, it is necessary that air be completely excluded therefrom if the system is to operate smoothly and reliably. During servicing of airplane hydraulic systems, it is therefore desirable to exclude entrance of air. It has been found, however, that when the filter elements of filters employed in these systems are removed for cleaning which is usually done at every 50 to 400 hours of service, air is unavoidably introduced into the system. As an indication of the trouble caused by the introduction of air, it has been found that as much as 16 man hours of labor are required after servicing an airplane to remove the air from the hydraulic system. This is an indication of the need for a filter device from which the filter elements can be removed, cleaned and replaced without the introduction of air into the remainder of the hydraulic system.

Another disadvantage of many of the prior art devices is the fact that they are not of the type which may be fabricated from a bar stock or forging, but must be made from castings. Because of the high pressure of the hydraulic systems employed in airplane control systems (3,000 p.s.i.), aluminum castings which are leak-proof are impossible to obtain with any degree of consistency.

It is therefore an object of the present invention to provide a filter assembly which may be disassembled for cleaning and re-assembled without introducing air into the fluid system to which it is adapted.

It is another object of this invention to provide a filter assembly of such design that it may be readily fabricated from a bar stock or forging.

In accordance with the present invention, the above-mentioned difficulties have been overcome by providing a filter assembly unit having a head containing inlet and outlet channels opening into the bottom thereof, a normally biased closed movable valve sleeve arranged to form a closure for these openings and a removably attached bowl containing a filter element arranged in operating alignment with the inlet and outlet openings in the bottom of the head and also containing a lifting member adapted to raise the valve sleeve to an open position when the bowl is attached to the head.

Internal sealing surfaces are arranged on both inner and outer faces of the movable valve sleeve and at the channel openings to provide a fluid-tight seal when the valve sleeve is in a closed position. External sealing surfaces are arranged on the head and bowl at the area of attachment to prevent escape of fluid from the bowl. The internal and external sealing surfaces are arranged relative to each other in such a manner that during removal of the bowl from the head the external sealing surfaces remain engaged until the internal surfaces become engaged. Conversely, during assembly, the exterior sealing surfaces become engaged prior to disengagement of the internal sealing surfaces.

Thus, when the bowl is securely in place, liquid enters the head through the inlet channel, passes through the opening into the bowl, is forced through the filter element and exits through the outlet opening and channel. During removal of the bowl, the valve sleeve descends to engage the sealing surfaces before disengagement of the external sealing surface. When the bowl is completely removed, circulation of fluid through the filter assembly is stopped. To prevent this, a bypass relief valve is preferably arranged within the head so that on closure of the valve sleeve, the fluid passes through from the inlet to the outlet through the opened relief valve.

On re-assembly, the bowl is substantially filled with fluid prior to attachment to the head. During attachment of the bowl, all entrapped air and excess fluid are forced out of the bowl before the external sealing surface becomes engaged and hence before the internal sealing surface becomes disengaged. In this manner, the filter element may be removed for cleaning and because of the automatic shut-off feature described above, no air is introduced into the hydraulic system. As can be seen, the unit is practically foolproof and no particular care is required on the part of the mechanic other than the necessity of filling the bowl substantially to the top with fluid prior to re-assembly.

These and other advantages of the present invention will become evident in the discussion of the accompanying drawings in which:

Figure 1 is an elevation in cross section of the filter assembly of this invention;

Figure 2 is a section taken along the view lines 2—2 of Figure 1, looking in the direction of the arrows;

Figure 3 is a partial elevation, in cross section, of the filter assembly of this invention, showing the bowl partially disengaged from the head member and showing both the external and interior sealing surfaces in sealing relationship; and Figure 4 is a section taken along the lines 4—4 of Figure 3, looking in the direction of the arrows.

Referring now to Figure 1, the filter assembly comprises a head 10 having an inlet channel 11 and outlet channel 12 with inlet chamber 13 and outlet chamber 14 in the bottom of the head. An intermediate cylindrical wall 15 within the head 10 separates the inlet channel 11 from the outlet channel 12. The cylindrical stem portion 16 depends from the top surface of the head and carries a sealing element 17 at its lower extremity. The valve stop member 18 of the stem 16 is curved in shape. A valve sleeve 19 is slidably mounted on cylindrical wall 15 and is biased in the closed position by means of spring 20. The valve sleeve 19 carries a sealing element 21 arranged to form a fluid-tight seal between the wall 15 and the inner surface of the valve sleeve 19. A sealing element 22 is carried by the valve sleeve 19 and is adapted to form a fluid-tight seal between the extended lower portion 23 of the head 10 and the valve sleeve 19.

The head 10 has a threaded lower portion 24 which forms an outer cylindrical enclosure for outlet channel 12. The threaded portion 24 is also adapted to cooperate with threaded portion 25 of bowl 26, forming an attaching means. A sealing element 27 is arranged at the lower outer surface of the head 10 and is adapted to form a fluid-tight seal between the head 10 and the bowl 26. The bowl 26 contains an insert 28 on which filter elements 29 and 30 are mounted. The tops of the filter elements 29 and 30 are maintained in position by a spider 31. The spider 31 contains sealing element 32 adapted to form a fluid-tight seal between filter element 29 and filter element 30. A sealing element 33 is also disposed between filter element 29 and filter element 30 on insert 28 to form a fluid-tight seal between the two filter elements. A lifting member 34 is put or fastened on the spider 31 which contains a sealing element 35 adapted to form a seal between the lifting member 34 and the bottom surface of the valve sleeve 19. The spider 31 contains openings 35a which allow fluid to flow from the chamber 36 within the bowl 26 to the outlet channel 12. The filter elements 29 and 30 are braced with external pressure differential load-bearing springs 37 and with internal stiffening springs 38. The bottom portion 39 of bowl 26 is adapted to receive a wrench.

Referring now to Figure 2, the relief valve bypass system is situated in the open portion of head 10. The inlet channel 11 is provided with an extension 40 communicating with outlet channel 12. A relief valve poppet 41 is placed in bypass channel 40 and is biased in a normally closed position by spring 42. A relief valve closure nut 43 is provided to regulate the pressure required to open the relief valve 41.

When the filter is placed in operating position, fluid enters the inlet channel 11 and passes through inlet chamber 13 into the central chamber of bowl 26. From this point it passes through filter element 29 into the chamber 44 and from the chamber 44 through the filter element 30 into the chamber 36. The fluid then travels through the opening 35a in the spider 31 through outlet chamber 14 to the outlet channel 12 and leaves the filter unit. When the valve sleeve 19 is in the closed position, the fluid entering inlet 11 passes through bypass channel 40 and opened relief valve 41 to outlet channel 12.

In disassembling the filter, bowl 26 is unscrewed from the threaded portion 25 of the head 10. As the bowl 26 is being removed, spring 20 forces the valve sleeve 19 with attached sealing elements into sealing relationship with the extended lower portion 23 of the head 10 and with sealing element 17 on the valve stop member 18. Sealing element 27 on the exterior surface of the head 10 maintains a sealing relationship with the bowl 26 until the valve sleeve 19 has formed a fluid-tight seal, thus excluding air from entering the bowl 26 until the remainder of the hydraulic system has been sealed off.

The position where both the exterior and interior sealing surfaces are engaged is shown in Figure 3. It can there be seen that every opening between the interior of the head 10 and the bowl 26 is effectively closed and sealed. Furthermore, the point of attachment of the bowl member 26 and the head 10 is effectively closed by engagement of sealing element 27.

After the filter elements 29 and 30 have been cleaned and re-assembled with bowl 26, the spider 31 and the lifting member 34, the bowl 26 is filled with the appropriate hydraulic fluid. The threaded portion of the bowl 26 is then engaged with the threaded portion 24 of the head 10 and screwed into position. During attachment of bowl 26, the sealing surfaces of the valve sleeve 19 remain engaged until the air and excess fluid remaining in the bowl 26 have been ejected through the threads. These sealing surfaces also remain engaged until the sealing element 27 becomes engaged with the bowl 26. Thus, the possibility of allowing air to enter the hydraulic system is successfully eliminated in a positive and substantially fool-proof manner.

As above mentioned, the filter assembly of this invention is particularly well adapted for use in hydraulic systems for aircraft, and these generally employ pressures in the range of 3,000 p.s.i. Any suitable type of filtering material may be employed, but it is preferred that porous, sintered stainless steel wire filters, such as those illustrated and described in U.S. Patent No. 2,925,650 dated February 23, 1960, be employed It will be understood that the above-described embodiment of the invention is illustrative only and that modifications will occur to those skilled in the art. Therefore, the invention is not to be limited to the specific apparatus disclosed herein but is to be defined by the appended claims.

I claim:

1. A filter comprising, in combination, a head, two channels for fluid passage therethrough, respectively communicating with two open-ended inner and outer concentric chambers separated by a cylindrical wall, a valve stop member mounted on said head and disposed across the open end of the inner chamber, a cylindrical valve sleeve having sealing surfaces upon its outer and inner side faces, and upon its bottom face, the outer side sealing surface being adapted to engage a corresponding sealing surface upon the outer wall of the outer chamber, and the inner side sealing surface being adapted to engage a corresponding sealing surface upon the outer face of the valve stop member, the sleeve being reciprocatingly mounted on the wall for movement into and out from engagement with such surfaces, the valve sleeve when in engagement with such surfaces closing off both outer and inner chambers, and being spring-biased into such position, a bowl removably attached to the head and having on the inner face of its outer wall a sealing surface extending over a long reach and adapted to engage in sealing relationship a corresponding sealing surface on the outer face of the head, a filter in said bowl, a valve actuating member associated with the bowl and having a sealing surface upon its upper face, said face being positioned to engage the bottom sealing surface of the valve sleeve in sealing relationship and to reciprocate the sleeve out from the sealing position into an open position and hold it in such position dependent upon the position of the bowl over the long reach of the sealing surfaces between the bowl and the head, the valve actuating member being so placed as to reciprocate the valve sleeve out from the closing off position only after the bowl has been sealed to the head through engagement of the aforesaid sealing surfaces therebetween.

2. A filter in accordance with claim 1, having sealing elements disposed at sealing surfaces between the head and bowl, between the valve sleeve and the head, between the valve sleeve and the valve stop member, and between the valve sleeve and the valve actuating member.

3. A filter in accordance with claim 1, in which the head is provided with a relief passage connecting the inlet and outlet passages, and the valve sleeve is adapted to reciprocate into a position to close off said passage when sealingly engaged by the valve actuating member, and to open said passage when spring-biased into its sealing position.

4. A filter in accordance with claim 1, in which the head and bowl are arranged so that the bowl depends from the head, and the valve sleeve sealing position is below the sealing surfaces between the bowl and head, whereby during assembly using a bowl filled with fluid the valve sleeve will be immersed in fluid and air displaced from therebelow before the bowl becomes sealed to the head, thereby ensuring zero entrapment of air in the system.

References Cited in the file of this patent

UNITED STATES PATENTS

| | | |
|---|---|---|
| 1,821,082 | Tyler | Sept. 1, 1931 |
| 2,431,782 | Walton et al. | Dec. 2, 1947 |
| 2,544,244 | Vokes | Mar. 6, 1951 |